United States Patent [19]
Duggan

[11] 3,911,764
[45] Oct. 14, 1975

[54] CHAIN GUIDING APPARATUS
[76] Inventor: James Daniel Duggan, 47 Avenue du Braou, 64200 Biarritz, France
[22] Filed: Oct. 23, 1974
[21] Appl. No.: 517,427

[52] U.S. Cl. .................................. 74/577 R; 74/240
[51] Int. Cl.² ... G05G 1/00; G05G 3/00; F16H 7/18
[58] Field of Search ................. 74/577 R, 611, 240; 254/175.7

[56] References Cited
UNITED STATES PATENTS
3,803,942   4/1974   Duggan ............................. 74/577 R

*Primary Examiner*—Leonard H. Gerin
*Attorney, Agent, or Firm*—Waters, Schwartz & Nissen

[57] ABSTRACT

A chain guiding apparatus is mounted on a sea-going rig and guides an anchor chain extending from a windlass. The apparatus comprises a frame fixed to the rig and an arm pivotally secured at one end to the frame. Load cells are positioned between the other end of the arm and the frame. The chain extends around a pulley mounted on the arm so that the load cells are compressed when the chain is tensioned. The pulley has fixed thereto a ratchet ring engageable by an hydraulically operable pawl mounted on the arm.

5 Claims, 2 Drawing Figures

CHAIN GUIDING APPARATUS

BACKGROUND OF THE INVENTION

1. Field of the Invention

This invention relates to an apparatus for guiding a chain.

2. Description of the Prior Art

Wildcat fairleaders incorporating pulleys for guiding chains are known. In the case of an anchor chain of a sea-going ship or rig, where the chain is held securely at a windlass, the tension in the chain must not be allowed to rise above a maximum value.

From the German Offenlegungschrift 2,239,183, it is known to hold the chain securely at a wildcat fairleader by applying to the fairleader an hydraulically operable pawl.

The known wildcat fairleaders have the disadvantage that they give no indication of the tension in the chain.

SUMMARY OF THE INVENTION

According to the present invention, there is provided a chain guiding apparatus comprising a support, an arm pivotally mounted on said support so as to be turnable about a first pivot axis, a load measuring device mounted between said arm and said support at a location spaced from said axis and whereby said arm is supported on said support at said location against turning about said first pivot axis in one sense, a chain guiding pulley turnably mounted on said arm at a second location spaced from said pivot axis for turning about an axis of turning substantially parallel to said pivot axis, and a pawl pivotally mounted on said arm so as to be turnable about a second pivot axis between an engaged position in which said pawl prevents turning of said pulley in one sense about said axis of turning relative to said support and a disengaged position in which said pawl allows such turning of said pulley.

With this apparatus, it is possible to obtain a reading of chain tension from the load measuring device both when the pawl is engaged and when the pawl is disengaged.

In order that a common scale calibration can be used for both of these conditions, it is advantageous for the equation $$\frac{A}{C} = 2 \cos \alpha$$

to be substantially satisfied, where $A$ = the perpendicular distance between said first pivot axis and the intended line of action of the tension force, with said pawl engaged, in that section of the chain extending from the pulley in the sense in which said pawl prevents turning of said pulley, $C$ = the perpendicular distance between said first pivot axis and the intended line of action of the resultant of the tension forces, with said pawl disengaged, in the respective sections of the chain extending from the pulley, and $\alpha$ = half of the angle included between these chain sections, with said pawl disengaged.

BRIEF DESCRIPTION OF THE DRAWINGS

In order that the invention may be clearly understood and readily carried into effect, reference will now be made, by way of example, to the accompanying drawings, in which.

DESCRIPTION OF THE PREFERRED EMBODIMENT

Figure 1:
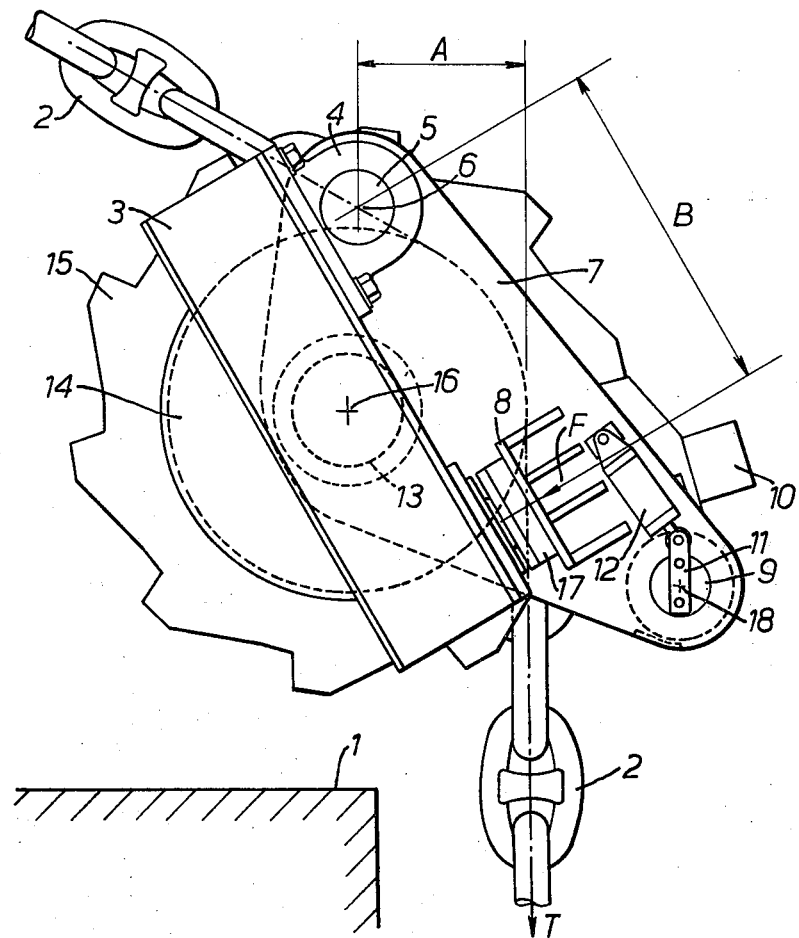
FIG. 1 shows an end elevation of a chain guiding apparatus for an anchor chain of a ship or rig, a pawl of the apparatus being in an engaged position.

Referring to the drawings, the apparatus is assumed to be mounted at the edge of a platform 1 of a sea-going rig and guides an anchor chain 2 which extends downwardly to the apparatus from a windlass (not shown) to the left of each FIGURE, and thence descends vertically downwards over the edge of the platform. The apparatus includes two end support members 3 (of which only one is seen) fixed firmly to the platform 1 by some bracket means (not shown). On these two members 3 are mounted respective end bearings 4 (of which only one is seen) bearing a pivot pin 5 having a horizontal axis 6. Mounted on the pivot pin 5 is an arm comprised of two parallel, substantially triangular, plates 7 (of which only one is seen) extending perpendicularly to the axis 6. Each plate 7 includes at the outer face thereof a projecting bracket 8. Between each bracket 8 and the adjacent support member 3 is mounted a load cell 17 whereby the arm 7, 8 is supported on the member 3 against turning about the axis 6 in a clockwise sense. Mounted between corners of the substantially triangular plates 7 remote from the pin 5 is a pivot pin 9 which has a horizontal axis 18 and to which is fixed one part of an hydraulically collapsible pawl 10, which is as disclosed in U.S. Pat. No. 3,803,942.

Figure 2:
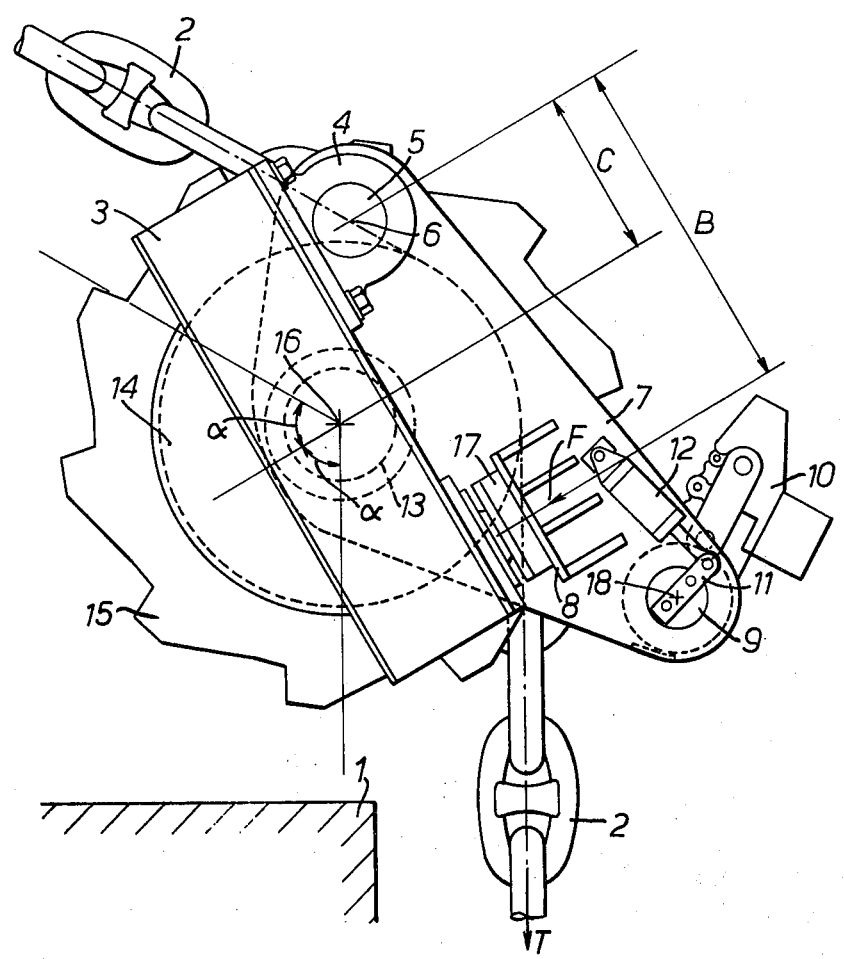
FIG. 2 shows an end elevation of the apparatus, but with the pawl in a disengaged position.

Connected to the pin 9 by way of a crank 11 is an hydraulic piston-and-cylinder device 12, which is operative to displace the pawl 10 between its engaged position shown in FIG. 1 and its disengaged position shown in FIG. 2. Extending between respective other corners of the substantially triangular plates 7 is a shaft 13 which has a horizontal axis 16 and on which is freely rotatably mounted a chain-guiding pulley 14 which has fixed thereto a ratchet-toothed ring 15 whereof the teeth are engageable by the pawl 10 to prevent rotation of the pulley 14 in the clockwise sense.

When the chain-guiding apparatus is in use, readings derived from the load cell 17 are transmitted to a remote control station (not shown) from which the windlass and the device 12 are operable. It is clearly advantageous if the arrangement of the apparatus is such that, for a particular tension in the chain 2, the total force F applied to the load cells, and thus the reading produced on a gauge at the remote control station and connected to the load cells, is unaffected by whether the apparatus is in the condition of FIG. 1, i.e., with substantially no tension in the chain section extending upwardly from the pulley, but with the particular tension T in the chain section extending vertically downwards from the pulley, or whether the apparatus is in the condition shown in FIG. 2, i.e., with the particular tension T in both sections of the chain 2.

It can be seen from FIG. 1 that, in the condition of FIG. 1, $$F = \frac{A \times T}{B},$$

where
- $A$ = the perpendicular distance between the axis 6 and the intended line of action of the tension force $T$ in that section of the chain extending vertically downwards from the pulley, and
- $B$ = the perpendicular distance between the axis 6 and the line of action of the force $F$.

Also, from FIG. 2, it can be seen that, in the condition of FIG. 2, $$F = \frac{C \times R}{B},$$

where
- $R$ = the resultant of the tension forces $T$, through the axis 16, and
- $C$ = the perpendicular distance between the axis 6 and the intended line of action of the resultant $R$.

Since $R = 2T \cos\alpha$, where $\alpha$ = half of the angle included between the chain sections, it follows that $$\frac{A}{C} = 2 \cos\alpha$$

for the requirement in question to be satisfied.

The apparatus described has several advantages. Firstly, the provision of the collapsible pawl 10 ensures that the chain can be released in an emergency, and that such release can be carried out from a remote position irrespective of the tension in the chain. Secondly, the arrangement whereby the incorporated load cells sense the mooring tensions continuously and issue the same relative readings, irrespective of whether the apparatus is acting as a chainstopper (FIG. 1) or as a wildcat fairleader (FIG. 2), enables a common calibration to be used for the gauge connected to the load cells. Thirdly, any suitable standard windlass can be used with this apparatus. Fourthly, since the pawl 10 cooperates with the teeth of the ratchet ring 15 and does not directly bear on the links of the chain 2, there is no possibility of damage to the links by the pawl.

I claim:

1. A chain guiding apparatus comprising a support, an arm pivotally mounted on said support so as to be turnable about a first pivot axis, a load measuring device mounted between said arm and said support at a location spaced from said axis and whereby said arm is supported on said support at said location against turning about said first pivot axis in one sense, a chain guiding pulley turnably mounted on said arm at a second location spaced from said pivot axis for turning about an axis of turning substantially parallel to said pivot axis, and a pawl pivotally mounted on said arm so as to be turnable about a second pivot axis between an engaged position in which said pawl prevents turning of said pulley in one sense about said axis of turning relative to said support and a disengaged position in which said pawl allows such turning of said pulley.

2. An apparatus according to claim 1, wherein $A/C = 2 \cos\alpha$, where
- $A$ = the perpendicular distance between said first pivot axis and the intended line of action of the tension force, with said pawl engaged, in that section of the chain extending from the pulley in the sense in which said pawl prevents turning of said pulley,
- $C$ = the perpendicular distance between said first pivot axis and the intended line of action of the resultant of the tension forces, with said pawl disengaged, in the respective sections of the chain extending from the pulley, and
- $\alpha$ = half of the angle included between these chain sections, with said pawl disengaged.

3. An apparatus according to claim 1, wherein said load measuring device comprises a load cell.

4. An apparatus according to claim 1, wherein said pulley comprises a series of ratchet teeth with which said pawl engages when in said engaged position thereof.

5. An apparatus according to claim 1, and further comprising a power actuating device operable to move said pawl between the engaged and disengaged positions thereof.

* * * * *